US012423341B2

(12) United States Patent
Vora et al.

(10) Patent No.: US 12,423,341 B2
(45) Date of Patent: Sep. 23, 2025

(54) OMNICHANNEL VIRTUAL ASSISTANT USING ARTIFICIAL INTELLIGENCE

(71) Applicant: International Business Machines Corporation, Armonk, NY (US)

(72) Inventors: Janki Vora, Lewisville, TX (US); Mathews Thomas, Flower Mound, TX (US); Tassanee Kraipon Supakkul, Tarrant, TX (US); Utpal Mangla, Toronto (CA); Steven Layne Canepa, Woodland Hills, CA (US)

(73) Assignee: International Business Machines Corporation, Armonk, NY (US)

(*) Notice: Subject to any disclaimer, the term of this patent is extended or adjusted under 35 U.S.C. 154(b) by 877 days.

(21) Appl. No.: 16/682,001

(22) Filed: Nov. 13, 2019

(65) Prior Publication Data

US 2021/0141820 A1    May 13, 2021

(51) Int. Cl.
*G06F 16/334*       (2025.01)
*G06F 16/3329*      (2025.01)
*G06F 16/335*       (2019.01)
*G06F 40/216*       (2020.01)
*G06F 40/279*       (2020.01)
(Continued)

(52) U.S. Cl.
CPC ...... *G06F 16/3344* (2019.01); *G06F 16/3329* (2019.01); *G06F 16/337* (2019.01); *G06F 40/216* (2020.01); *G06F 40/279* (2020.01); *G06F 40/295* (2020.01); *G06F 40/30* (2020.01); *H04L 51/02* (2013.01); *G06F 40/205* (2020.01); *G06Q 30/0204* (2013.01)

(58) Field of Classification Search
None
See application file for complete search history.

(56) References Cited

U.S. PATENT DOCUMENTS 10,249,289 B2 *   4/2019   Chun ................... G10L 13/027
10,460,107 B2 *  10/2019   Crofton ................ G06F 21/566
(Continued)

FOREIGN PATENT DOCUMENTS

CN       105975622 A       9/2016
IN     201841018570 A   *  11/2019

OTHER PUBLICATIONS

Matthews, K., "How Chatbots Are Learning Emotions Using Deep Learning," https://chatbotsmagazine.com/how-chatbots-are-learning-emotions-using-deep-learning-23e1085e4cfe, printed Jul. 29, 2019, 5 pgs.

(Continued)

Primary Examiner — Richa Sonifrank
(74) Attorney, Agent, or Firm — Eric W. Chesley

(57) ABSTRACT

Provided is a method for generating a personalized response to a user query. An omnichannel assistant receives a query from a user. The query is parsed to identify a user request. A user profile of the user is analyzed to determine one or more sources for responding to the query. The user profile includes a set of trusted sources for the user. Data for responding to the query is retrieved from the one or more sources. A channel for a response is selected based at least in part on the user profile. The response to the query is generated. The response is generated using the retrieved data, the selected channel, and the user profile. The response is then transmitted to the user.

18 Claims, 7 Drawing Sheets

(51) Int. Cl.
    *G06F 40/295*     (2020.01)
    *G06F 40/30*     (2020.01)
    *G06Q 30/0204*     (2023.01)
    *H04L 51/02*     (2022.01)
    *G06F 40/205*     (2020.01)

(56) References Cited

U.S. PATENT DOCUMENTS

| | | | |
|---|---|---|---|
| 11,281,983 B2* | 3/2022 | Vallam | G06N 7/01 |
| 11,423,413 B2* | 8/2022 | Pandey | G06Q 10/06311 |
| 12,361,220 B1* | 7/2025 | Krull | G06Q 10/0635 |
| 2007/0033005 A1* | 2/2007 | Cristo | G10L 15/19 704/9 |
| 2007/0038436 A1* | 2/2007 | Cristo | G06F 40/232 704/E15.04 |
| 2007/0050191 A1* | 3/2007 | Weider | G06F 16/951 704/E15.04 |
| 2008/0243744 A1* | 10/2008 | Isaacs | G06F 16/243 706/46 |
| 2012/0016678 A1 | 1/2012 | Gruber et al. | |
| 2014/0074629 A1* | 3/2014 | Rathod | G06Q 10/10 705/14.73 |
| 2014/0279050 A1 | 9/2014 | Makar et al. | |
| 2014/0280623 A1 | 9/2014 | Duan | |
| 2016/0294739 A1 | 10/2016 | Stoehr et al. | |
| 2016/0352658 A1 | 12/2016 | Capper et al. | |
| 2017/0031978 A1* | 2/2017 | Cunico | G06F 16/9535 |
| 2017/0180284 A1* | 6/2017 | Smullen | H04L 63/18 |
| 2017/0279906 A1* | 9/2017 | Laird-McConnell | H04L 67/10 |
| 2018/0018373 A1* | 1/2018 | Yazdian | G06F 16/24532 |
| 2018/0181558 A1* | 6/2018 | Emery | H04L 51/02 |
| 2018/0189273 A1* | 7/2018 | Campos | H04L 51/02 |
| 2019/0132451 A1* | 5/2019 | Kannan | H04M 3/5235 |
| 2019/0140986 A1 | 5/2019 | Anderson et al. | |
| 2019/0213465 A1* | 7/2019 | Avrahami | G10L 15/197 |
| 2019/0251165 A1* | 8/2019 | Bachrach | G06N 3/084 |
| 2019/0294666 A1 | 9/2019 | Williams et al. | |
| 2019/0364117 A1* | 11/2019 | Rogynskyy | G06F 16/24558 |
| 2020/0012655 A1* | 1/2020 | Robichaud | G06N 20/00 |
| 2020/0073982 A1* | 3/2020 | Kolluri Venkata Sesha | G06F 11/3082 |
| 2020/0202071 A1* | 6/2020 | Ghulati | G06Q 50/01 |
| 2020/0252353 A1* | 8/2020 | Lalji | G06F 40/30 |
| 2020/0356999 A1* | 11/2020 | Pandey | G06Q 10/06311 |
| 2020/0387629 A1* | 12/2020 | Yang | G10L 15/1822 |
| 2021/0141938 A1* | 5/2021 | Carter | H04L 63/102 |
| 2021/0266178 A1* | 8/2021 | Grube | G06F 40/284 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Mool, T., "Omnichannel vs. Multichannel: How a Transit Chatbot has Simplified Reach," https://nativemsg.com/blog/omnichannel-marketing-vs-multichannel-marketing, printed Jul. 29, 2019, 4 pgs.

* cited by examiner

OMNICHANNEL VIRTUAL ASSISTANT USING ARTIFICIAL INTELLIGENCE

BACKGROUND

The present disclosure relates generally to the field of artificial intelligence, and more particularly to a personalized, omnichannel virtual assistant.

Virtual assistants (e.g., chatbots) are artificial intelligence systems that interact with users. Chatbots are usually designed for a single enterprise or to answer a single type of question (e.g., a math chatbot answering questions about math related topics, etc.). Chatbots may employ conversational artificial intelligence or analysis to automate communication with users.

SUMMARY

Embodiments of the present disclosure include a method, computer program product, and system for providing a personalized response to a user query. An omnichannel assistant receives a query from a user. The query is parsed to identify a user request. A user profile of the user is analyzed to determine one or more sources for responding to the query. The user profile includes a set of trusted sources for the user. Data for responding to the query is retrieved from the one or more sources. A channel for a response is selected based at least in part on the user profile. The response to the query is generated. The response is generated using the retrieved data, the selected channel, and the user profile. The response is then transmitted to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
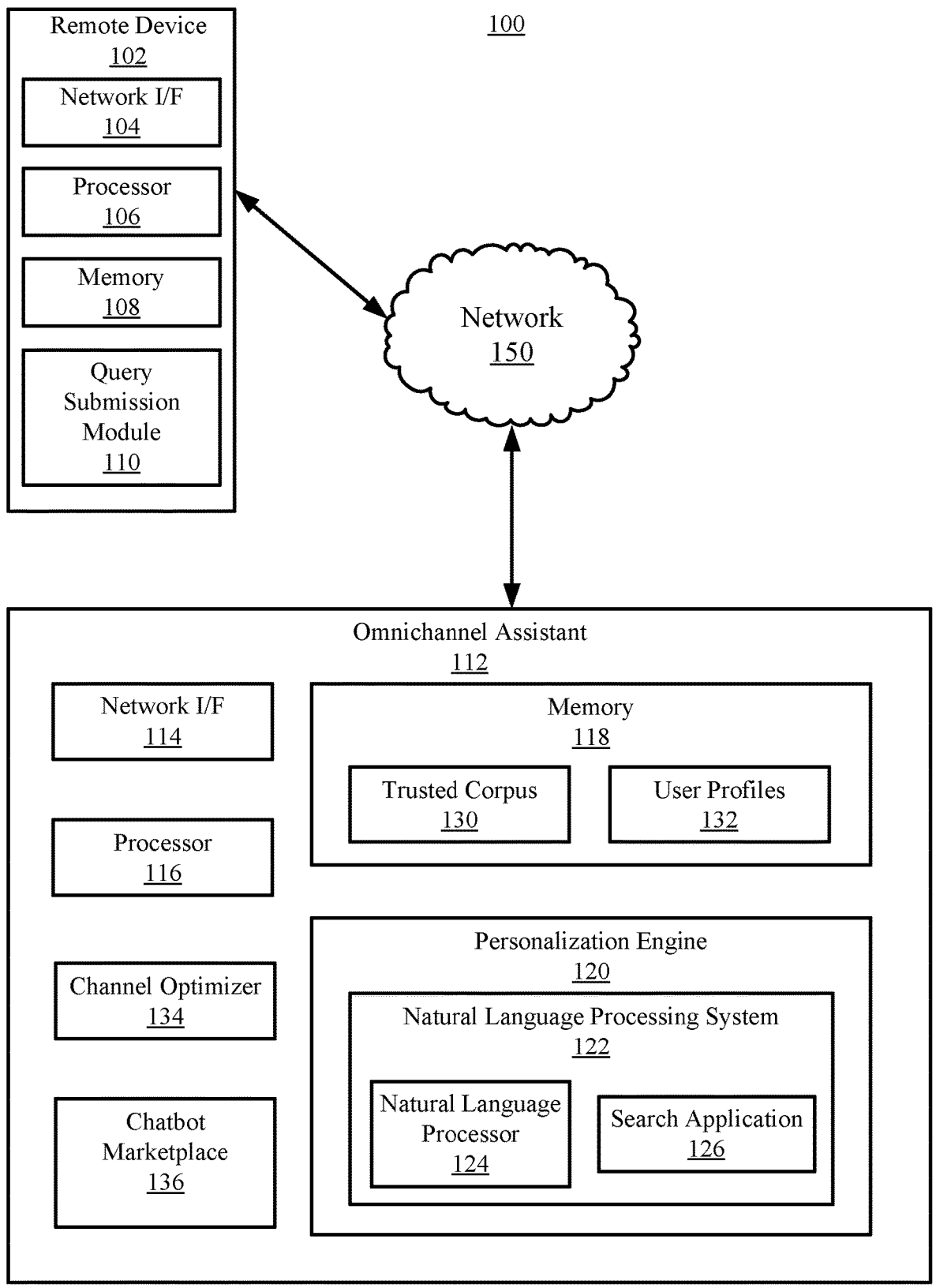
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of artificial intelligence, and in particular to a personalized, omnichannel virtual assistant. While the present disclosure is not necessarily limited to such applications, various aspects of the disclosure may be appreciated through a discussion of various examples using this context.

Virtual assistants, such as chatbots, are becoming increasingly pervasive. However, chatbots currently have several limitations that reduce their effectiveness and usefulness. One such limitation is that users may consider chatbots untrustworthy. For example, if a user accesses a company chatbot to get more details about a product sold by that company, the user may believe that he will only get positive information from that chatbot. This limits the trust that users have in chatbots and, therefore, the usefulness of a chatbot.

As another example, chatbots currently utilize a limited set of channels, with many implementations limited to just a single channel, and don't allow users to efficiently change between channels. Users, however, may prefer to interact with the chatbot over multiple channels. For example, a chatbot may suggest the user look at an online video to get more information about a topic, product, or service. However, due to limitations of the chatbot, the chatbot may not be able to locate the video and make it available to the user. Similarly, some users may prefer to communicate with chatbots verbally instead of through text. However, in many cases, the chatbot may only be able to communicate in one medium, and may not be able to switch to verbal communication on the fly, if at all.

Furthermore, current chatbot implementations may not be personalized to the user, and the user does not have enough information regarding the underlying data sources and external entities that the chatbot uses. This reduces the user's trust in the answers provided by the chatbot. Furthermore, because chatbots are often domain specific (e.g., specific to a given company), users are required to trust the chatbot without any previous relationship on which to build that trust. For example, during the purchase process of a product, a chatbot may require some personal information about the user, and the user has no idea if she should trust this chatbot.

Embodiments of the present disclosure seek to address the above, and other, problems though providing an omnichannel assistant (e.g., a personalized chatbot) that provides an experience tailored to an individual user. The omnichannel assistant provides customized answers based on user profile characteristics (e.g., simple response for kids and more complex for adults), as well as the channel being utilized. The user profile can be generated specific to the user by analyzing various data sources of the user (e.g., social media posts, manual entry, etc.) using natural language processing to determine characteristics of the user (e.g., age, preferred sources of information, mood, etc.). Because the omnichannel assistant is tailored to the user, as opposed to, for example, being trained for a generic user or owned by a company that the user is considering purchasing from, the user may have increased trust in the results provided by the omnichannel assistant.

Furthermore, in some embodiments, the omnichannel assistant can be trained based on individual preferences. For example, the omnichannel assistant can be trained to trust certain sources (e.g., impartial, third-party reviews, trust news sources, etc.), as opposed to other sources (e.g., reviews provided by the company that sells the product, news sources that are not considered as trustworthy, etc.), based on the user's preferences. When necessary, the omnichannel assistant can communicate with individuals or other chatbots (e.g., chatbot to chatbot communication) through public and/or private channels. Again, the individuals or chatbots that may be communicated with can be tailored to the user. For example, the omnichannel assistant may be allowed to communicate only with other trusted chatbots. This increases the user's trust in the underlying data sources and/or external entities that provided the data, thereby increasing the user's trust in the omnichannel assistant. Furthermore, the user may only have to communicate with a single, trusted chatbot (e.g., the omnichannel assistant), and that chatbot can be trained to communicate with other chatbots or individuals, as necessary, to assist the user (e.g., to purchase a product, find an answer to a question, etc.).

Embodiments of the present disclosure include an omnichannel assistant that offers multi-channel communication and can be automatically and dynamically adjusted based on user preferences, characteristics (e.g., age), and other factors like mood. For example, the omnichannel assistant may provide advanced and customized answers based on the user's level of maturity, speed of typing, and/or sophistication of words.

Embodiments of the present disclosure utilize a chatbot marketplace. The marketplace enables the omnichannel assistant to reach out to other chatbots, get a weighted response for the same question, and rank the responses based on personal preferences of the user. The final answer may be generated from the weighted responses and presented to the user. The marketplace acts similar to getting second opinions from various doctors about a condition.

In some embodiments, the omnichannel assistant includes a personalization engine to help create a custom and unique experience for each user. The personalization engine further enables the omnichannel assistant to target the content delivered to the user based on what the omnichannel assistant knows about her, including her personality, preferences, moods, etc. Furthermore, the personalization engine allows the omnichannel assistant to provide an easy or simplified answer if the response is for kids and more sophisticated answers for adults based on user interaction information (e.g., typing speed of the user, the language used in the question, the topic of the question, etc.), and other factors.

Embodiments of the present disclosure allow the user to define what sources of information the omnichannel assistant is permitted to use and/or categories of information relevant to the user based on what she trusts. The omnichannel assistant may also determine the most relevant sources it thinks the user should use. The omnichannel assistant then provides an answer from one of these trusted sources so the user's confidence level in the results will increase.

The omnichannel assistant may also ensure that the ultimate response the user gets will be in a manner that she understands and prefers based on what the omnichannel assistant knows about the user from previous interactions, the current environment, and the user's existing situation (e.g., mood). As time goes, the omnichannel assistant can effectively become the user's front-end not only to other chatbots but to individuals. For example, if someone want to know the user's schedule, they could contact the omnichannel assistant. As another example, if someone needs the user's credit card information, they can ask the user's omnichannel assistant, the omnichannel assistant can verify why the number is needed in a similar manner that the user would, and then the omnichannel assistant can provide or refuse to provide the information.

Embodiments of the present disclosure allow interaction with the omnichannel assistant by typing or speaking on a device. Additionally, the user may interact with the omnichannel assistant though video or another channel. The user can easily move across channels, and the omnichannel assistant can adjust accordingly. Each interface may be personalized (e.g., if the response is too long via voice, provide text; if the response is better explained via video, then transfer to video or interactive board).

It is to be understood that the aforementioned advantages are example advantages and should not be construed as limiting. Embodiments of the present disclosure can contain all, some, or none of the aforementioned advantages while remaining within the spirit and scope of the present disclosure.

As discussed herein, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and an omnichannel assistant 112 (e.g., a personalized chatbot system).

Consistent with various embodiments, the remote device 102 and the omnichannel assistant 112 may be computer systems. The remote device 102 and the omnichannel assistant 112 may include one or more processors 106 and 116 and one or more memories 108 and 118, respectively. The remote device 102 and the omnichannel assistant 112 may be configured to communicate with each other through an internal or external network interface 104 and 114. The network interfaces 104 and 114 may be, e.g., modems or network interface cards. The remote device 102 and/or the omnichannel assistant 112 may be equipped with a display or monitor. Additionally, the remote device 102 and/or the omnichannel assistant 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The remote device 102 may, in various embodiments, be connected to or include an output device. The output device includes any device that may be used to read, listen to, print out, or watch the response received from the omnichannel assistant 112. For example, the output device may be a screen, a tablet, an e-reader, and/or a printer. In some embodiments, the remote device 102 and/or the omnichannel assistant 112 may be servers, desktops, laptops, or hand-held devices (e.g., smartphones).

The remote device 102 and the omnichannel assistant 112 may be distant from each other and communicate over a network 150. In some embodiments, the omnichannel assistant 112 may be a central hub from which remote device 102 can establish a communication connection, such as in a client-server networking model. Alternatively, the omnichannel assistant 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the omnichannel assistant 112 may be local to each other and communicate via any appropriate local communication medium. For example, the remote device 102 and the omnichannel assistant 112 may communicate using a local area network (LAN), one or more hardwire connections, a wireless link or router, or an intranet. In some embodiments, the remote device 102 and the omnichannel assistant 112 may be communicatively coupled using a combination of one or more networks and/or one or more local connections. For example, the remote device 102 may be hardwired to the omnichannel assistant 112 (e.g., connected with an Ethernet cable) while a second remote device (not shown) may communicate with the omnichannel assistant using the network 150 (e.g., over the Internet).

In some embodiments, the network 150 may be (or include) a wireless communication link. The wireless communications link may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), 4G long-term evolution (LTE), fifth-generation (5G), or any other wireless communication technology or standard to establish a wireless communications link.

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit a query (e.g., a question, a request for data such as a video, a request to control another device) to the omnichannel assistants 112. For example, the remote device 102 may include a query submission module 110 and a user interface (UI). The query submission module 110 may be in the form of a web browser or any other suitable software module, and the UI may be any type of interface (e.g., command line prompts, menu screens, graphical user interfaces). The UI may allow a user to interact with the remote device 102 to submit, using the query submission module 110, one or more queries to the omnichannel assistant 112. In some embodiments, the remote device 102 may further include a receiver module (not shown). This module may be configured to receive responses to the queries from the omnichannel assistant 112.

In some embodiments, a user may scan physical documents into the remote device (or the omnichannel assistant). The remote device (or omnichannel assistant) may then perform optical character recognition on the scanned documents to convert the document to machine-encoded text. The machine-encoded text may, if necessary, be transmitted to the omnichannel assistant using the query submission module 110 and the user interface.

In some embodiments, the omnichannel assistant 112 may include a personalization engine 120. The personalization engine 120 may be configured to generate a user profile 132 for a user and store the user profile 132 in the memory 118. The personalization engine 120 may further be configured to personalize the response to the query based on the user profile 132 and a trusted corpus 130, which is stored in the memory 118. The trusted corpus 130 may include a set of data sources (e.g., individuals, chatbots, news websites, etc.) that the user trusts.

The personalization engine 120 may include a natural language processing system 122. The natural language processing system 122 may include a natural language processor 124 and a search application 126. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 3.

The search application 126 may be implemented using a conventional or other search engine, and may be distributed across multiple computer systems. The search application 126 may be configured to search one or more databases (e.g., trusted corpus 130) or other computer systems (e.g., other chatbots in the chatbot marketplace 136) for content that is related to a query submitted by a remote device 102. For example, the search application 126 may be configured to search a corpus (or universe) of sources related to the submitted query identify information useful to answer or otherwise respond to the query.

The omnichannel assistant 112 may further include a channel optimizer 134. The channel optimizer 134 may be configured to define the output format of the response. For example, the channel optimizer 134 may determine whether the response should be text, audio, video, other, and/or some combination thereof. The channel optimizer 134 may also be configured to make channel decisions as to where to send the response (e.g., to a smartphone, over the web, through email, in an app, in a call, etc.). The channel optimizer 134 may make these decisions based on preferences in the user profile 132 and/or depending on the content of the query or results.

While FIG. 1 illustrates a computing environment 100 with a single omnichannel assistant 112 and a single remote device 102, suitable computing environments for implementing embodiments of this disclosure may include any number of remote devices and omnichannel assistants. The various modules, systems, and components illustrated in FIG. 1 may exist, if at all, across a plurality of omnichannel assistants and remote devices. For example, some embodiments may include two omnichannel assistants. The two omnichannel assistants may be communicatively coupled using any suitable communications connection (e.g., using a WAN, a LAN, a wired connection, an intranet, or the Internet). The first omnichannel assistant may include a natural language processing system configured to analyze a query, and the second omnichannel assistant may include a software module configured to generate a response.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
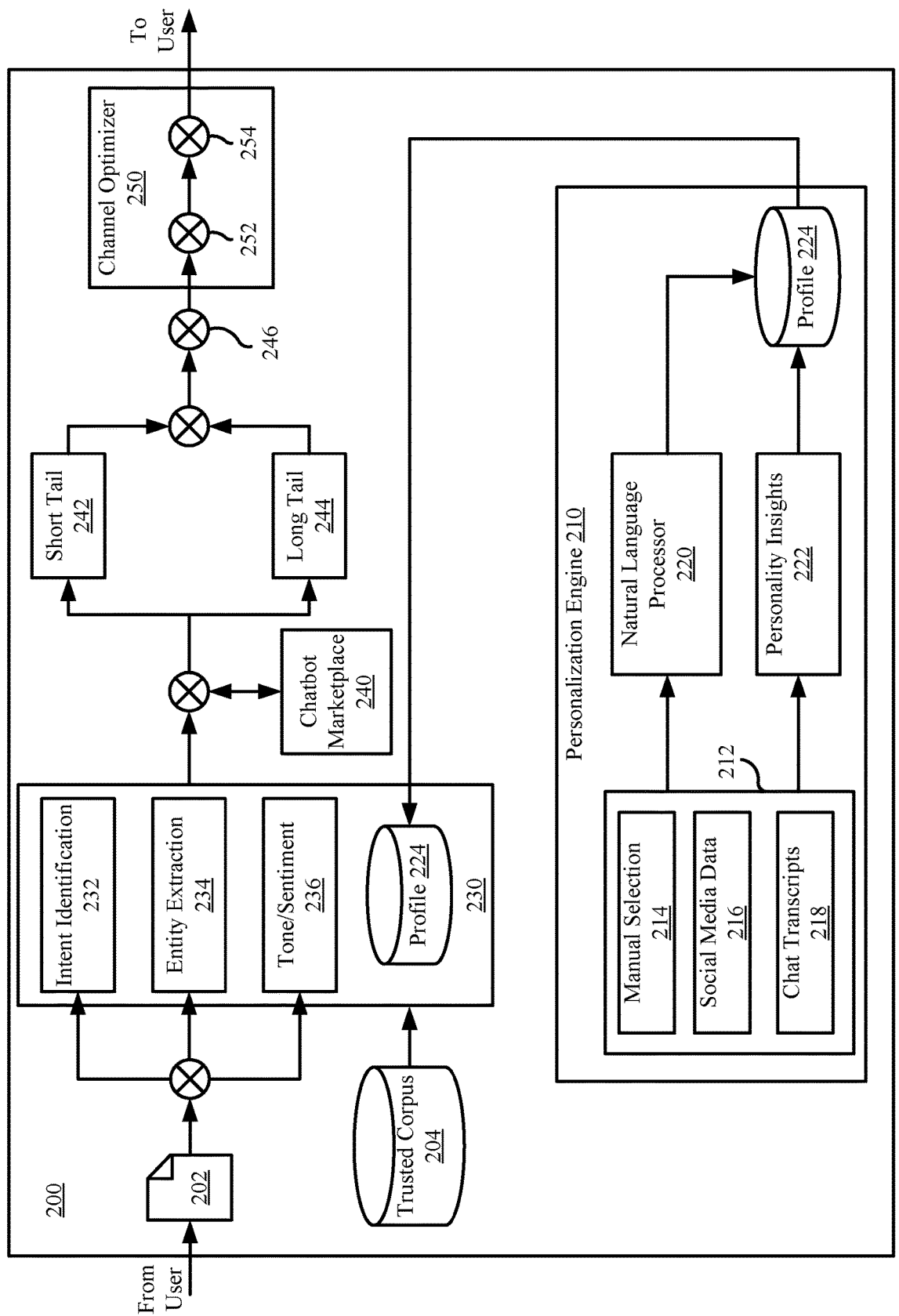
FIG. 2 illustrates a block diagram of an example omnichannel assistant, in accordance with embodiments of the present disclosure.

Referring now to FIG. 2, illustrated is a block diagram of an example omnichannel assistant 200, in accordance with embodiments of the present disclosure. The omnichannel assistant 200 may be configured to perform one or more of the methods described herein (e.g., method 400 of FIG. 4). For example, the omnichannel assistant 200 may be configured to receive a user query 202, analyze the query, generate a personalized response to the query 202, and output the personalized response to the user. The omnichannel assistant 200 may include a trusted corpus 204, a personalization engine 210, a query analyzer 230, a chatbot marketplace 240, and a channel optimizer 250.

The user query 202 may be in the form of an input conversation. For example, the omnichannel assistant 200 may extract, from a conversation with the user, one or more queries 202. The queries 202 may be in the form of multimedia, text, video, or any other communication type.

The trusted corpus 204 (also referred to herein as the trusted and ranked corpus) provides a unique way of getting personalized responses. During training, the omnichannel assistant 200 enables a special attribute based on personalized preferences on how to rank a response. This is separate from traditional training and learning processes for AI Systems. For instance, users and/or segments of users can select the sources they feel most favorable. These sources are stored in the trusted corpus 204 such that the omnichannel assistant 200 is trained on, and utilizes, the sources that the user trusts. The sources in the trusted corpus 204 may be based on manual suggestion (e.g., manual entry by the user) or using analytics. This enables the omnichannel assistant 200 to select responses in more personalized way.

The personalization engine 210 may be configured to create a custom and unique experience for each user and target the content delivered to the user (e.g., the response) based on what the omnichannel assistant 200 knows about the user (i.e., user characteristics). The user characteristics may include, for example, the user's personality, preferences, and moods. The personalization engine 210 may extract the user characteristics using a natural language processor 220 and personality insights 222. The user characteristics may be extracted from a plurality of sources 212, including manual selection by the user 214, social media data 216, and chat transcripts 218. The determined user characteristics may be used to better understand the user query 202, and to provide personalized responses to the user.

The natural language processor 220 may analyze keywords, entities, concepts, and taxonomy of the documents of the plurality of sources 212. For example, the natural language processor 220 may extract highly relevant terms and phrases (keywords), extract named entities such as persons, places, and organizations (entities), determine high level abstractions on how concepts relate to each other and identify concepts that aren't necessarily directly referenced in the text, but are nonetheless present (concepts), and classify or categorize the content (taxonomy). The natural language processor 220 may also perform tone analysis to extract the emotion(s), social tone(s), and writing tone(s) from the text. The natural language processor 220 may also classify content based on custom models specific to the user and/or similar users. An example natural language processor is described in more detail with respect to FIG. 3.

For example, the user conversation patterns in the chat transcripts 218 (and/or social media data 216) may provide details about the user's interests and needs. This information can be leveraged to create a preference that is of greater interest to that particular user. The personalization engine 210 can create a unique profile 224 for each user in real time. The unique profile 224 can be used to tailor the conversation with the user (e.g., the responses) as the interaction with the user occurs. Once the profile 224 is created, the personalization engine 210 can make adjustments and additions as the user inputs more information.

The personalization engine 210 may further include a component for determining personality insights 222 using the plurality of sources 212. The personality insights 222 may predict personality characteristics, needs, and values. For example, the personalization engine 210 may include WATSON® Knowledge Studio and Personality Insights (Watson is a registered trademark of International Business Machines Corporation headquartered in Armonk, NY) to get a more personalized enriched profile and to cater more personalized content to the user.

Information collected and analyzed by the personalization engine 210 can also be used to create communications that grab the attention of the user, which in turn creates and improves the user's experience, satisfaction, and trust with the omnichannel assistant 200. The personalization engine 210 can learn and respond in real-time to individual user behaviors, affinities, and activities, resulting in highly personalized and relevant responses. The personalization engine 210 may also take into account how the user reacts to the responses based on the subsequent dialogue (text or voice) and adjust the user profile 224 accordingly.

The query analyzer 230 may receive the user query 202 and extract various information about the query 202 (e.g., intent identification 232, entity extraction 234, and tone/sentiment 236 of the query 202). The query analyzer 230 may utilized the profile 224 for the user and the trusted corpus 204 of the user to better understand the query 202. Furthermore, the query analyzer 230 may utilize natural language processing to understand a natural language query. The query analyzer 230 may utilize the extracted information, the user profile 224, and the trusted corpus 204 to generate a proposed response to the query 202.

The chatbot marketplace 240 enables aggregation of responses from a variety of chatbots. Using the chatbot marketplace 240, the omnichannel assistant 200 can try to get the best rated response in case of uncertainty or if the user would like to do so. For example, if the omnichannel assistant 200 is unable to form a response using the query analyzer 230 and the trusted corpus 204, or if the response has a low confidence score (e.g., a score below a threshold confidence level, which may be predetermined), the omnichannel assistant 200 may request information (e.g., as response to the query 202) from one or more other chatbots in the chatbot marketplace 240. The query 202 may be transmitted to various chatbots, and the best responses from the chatbots are displayed. This allows the user to get opinions from multiple systems.

In some embodiments, there may be two chatbot marketplaces: a private marketplace and a public marketplace. The public marketplace may be open to any chatbot, while the private marketplace may be limited to chatbots that have been approved. The private marketplace may only include chatbot that have been vetted by the user and/or the omnichannel assistant and found to be trustworthy, or otherwise are considered inherently trustworthy. For example, the user may find responses by a particular chatbot to be consistently good, and therefore may approve that particular chatbot for inclusion in the user's private marketplace. As another example, a chatbot operated by the user's bank may be considered inherently trustworthy and included in the private marketplace. The private marketplace may be user specific (e.g., each user has their own private marketplace), or it may be group-specific (e.g., similar users share a private marketplace, all employees of a company have a shared private marketplace, etc.). In some embodiments, a user might have multiple private marketplaces (e.g., an individual one and a company-wide one).

In some embodiments, the omnichannel assistant 200 interacts only with chatbots in the private marketplace. As discussed above, the private marketplace includes specific chatbots that the user (and/or the omnichannel assistant 200) has a trusted relationship with, such as a bank chatbot from the user's bank. By conversing only with the trusted chatbots in the private marketplace, the omnichannel assistant 200 allows the user to have a single point of contact (i.e., with the omnichannel assistant 200), while still being able to collect information from a plurality of trusted chatbots (e.g., the trust bank chatbot).

In some embodiments, the omnichannel assistant may manage the identity of individuals preferences for personalization in a blockchain and encrypt it with generalized category. Information used for personalizing the response can be shared to manage compliance and regulations requirements. Blockchain trusted identity will create a decentralized approach to identity management. This would be particularly useful when information needs to be shared in the chatbot marketplace 240 to manage a consistent experience.

In some embodiments, the responses which come from the chatbot marketplace 240 can also be logged in a blockchain to manage billing, liability, or for other purposes. The blockchain would log responses picked from the chatbot marketplace 240 and record the bidding, response confidence level, and other attributes as well. This allows tracking the chronology of the ownership, custody, and/or location of historical chat responses.

In some embodiments, the identity management is shared in the chatbot marketplace 240 and the responses that are received will be personalized. Various criteria like response quality, confidence, and ranking can be used and matched with the user's personal choices and data source references to finalize what output should be picked from the chatbot marketplace 240. In addition, reliability of responses from past interactions and ranking of chatbot, which could be part of the overall governance of the chatbot marketplace 240, can be included in the weighted score The protocol for communication can be established in a variety of ways. For example, a given chatbot needing information can broadcast to all chatbots or a set of trusted chat bots. Chatbots can develop trust based on past experience or a trust criterion established by a trusted ranking engine. The chatbot marketplace 240 will establish relationships between the chatbots including connection rules and protocol for data transfer. Transactions will be stored in Blockchain so violations of established rules and protocols can be easily identified Long tail conversations 244 are more complicated to analyze than short tail conversations 242. In a short tail conversation 242, the intent of the sentence and the response may be pre-programmed in the conversation, which can allow them to be easily determined. In a long tail conversation, the omnichannel assistant 200 (or other chatbot) may need to look at additional AI systems or the overall context of the conversation to determine the answer. The channel optimizer 250 takes the type of response (e.g., short tail 242 or long tail 244) into consideration when selecting the channel and device to respond to. For example, if the query 202 asks a relatively simple question, the response may likely be relatively simple (e.g., a short tail chat response), which may affect the channel selected (e.g., a text response) and the device to which the response is sent (e.g., a smartphone). On the other hand, a long tail chat response 244 may require a video response to ensure the answer is conveyed effectively depending on the age, maturity, etc. of user chatting with the omnichannel assistant 200.

The output selection and analysis 246 from the query analyzer 230 and/or chatbot marketplace 240 is sent to the channel optimizer 250. As discussed herein, the channel optimizer 250 defines the output format of the response (e.g., as text, audio, video, or other). This may be done with an output format selector 252. The channel optimizer also determines where to send the response (e.g., to a smartphone, over the web, etc.) using a channel selector 254. As discussed herein, the output format selector 252 and the channel selector 254 may make decisions based on preferences or depending on content of the query 202 or response. For example, the output format selector 252 may determine that the response is very long, and accordingly decide that outputting a video of the response would be better than text.

The goal of the channel optimizer 250 is not the simple ability to share content on multiple channels, but rather to customize the content according to channel. For example, if the content is appropriately shown using a video, and that is consistent with the user's preference in the user profile 224, then the channel optimizer 250 may display the response video instead of as a text document. Additionally, if the channel optimizer 250 is aware of multiple screen available to the user, the response can be shown on the second screen while still keeping context across the screens.

Figure 3:
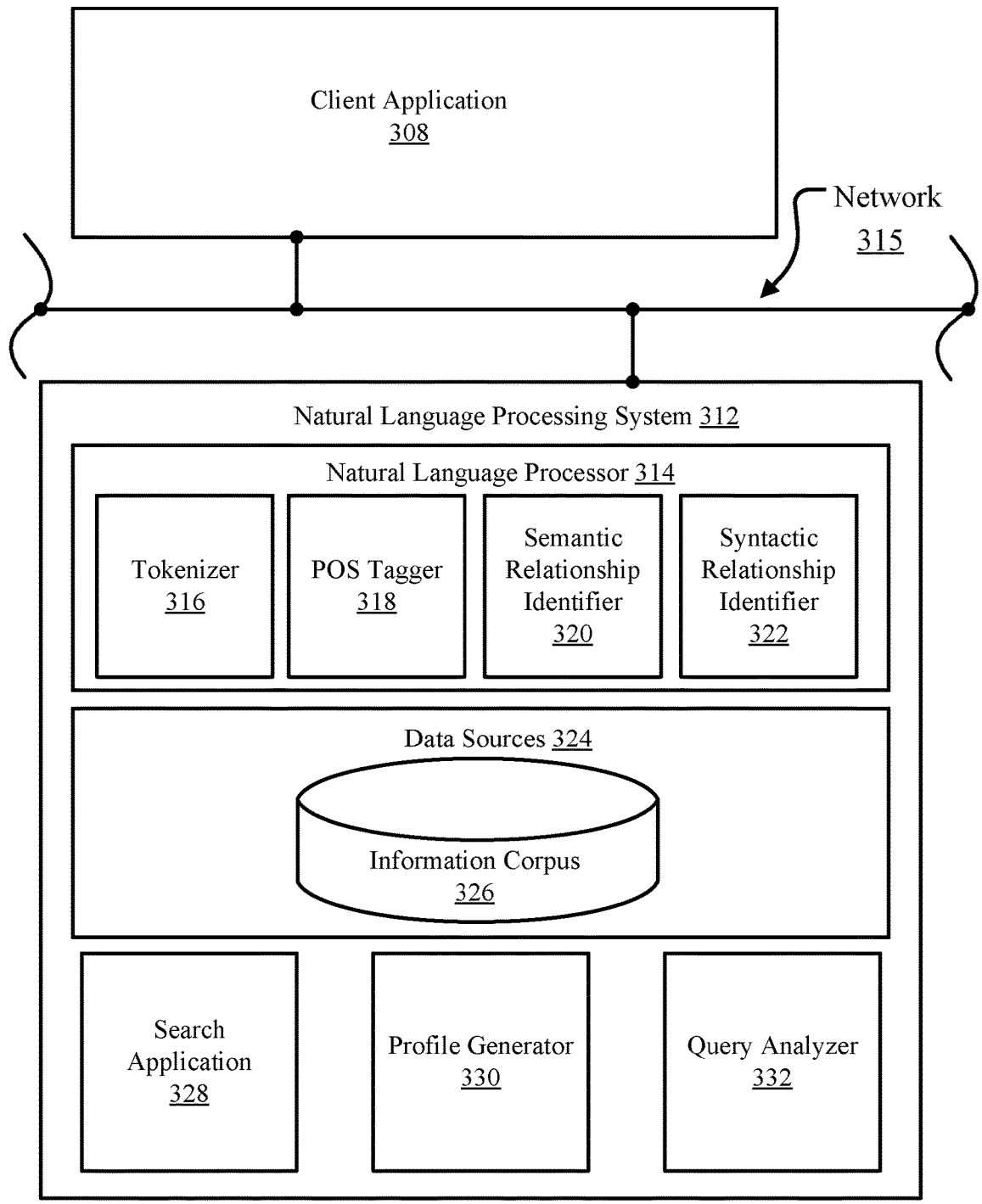
FIG. 3 illustrates a block diagram of an example natural language processing system configured to analyze user data and generate an enriched profile for a user, in accordance with embodiments of the present disclosure.

Referring now to FIG. 3, shown is a block diagram of an exemplary system architecture 300, including a natural language processing system 312, configured to generate a user profile for an omnichannel assistant, and to respond to user queries using the user profile, in accordance with embodiments of the present disclosure. In some embodiments, a remote device (such as remote device 102 of FIG. 1) may submit a query to be analyzed to the natural language processing system 312 which may be housed on an omnichannel assistant (such as omnichannel assistant 112 of FIG. 1). Such a remote device may include a client application 308, which may itself involve one or more entities operable to generate or modify a query that is then dispatched to a natural language processing system 312 via a network 315.

Consistent with various embodiments, the natural language processing system 312 may respond to query submissions sent by the client application 308. Specifically, the natural language processing system 312 may analyze a received query to generate a personalized response. In some embodiments, the natural language processing system 312 may include a natural language processor 314, data sources 324, a search application 328, a profile generator 330, and a query analyzer 332.

The natural language processor 314 may be a computer module that analyzes the received queries and other electronic documents (e.g., social media posts, chat transcripts) to generate a user profile and/or personalize query responses. The natural language processor 314 may perform various methods and techniques for analyzing electronic documents (e.g., syntactic analysis, semantic analysis, etc.). The natural language processor 314 may be configured to recognize and analyze any number of natural languages. In some embodiments, the natural language processor 314 may parse passages of the electronic documents. Further, the natural language processor 314 may include various modules to perform analyses of electronic documents. These modules may include, but are not limited to, a tokenizer 316, a part-of-speech (POS) tagger 318, a semantic relationship identifier 320, and a syntactic relationship identifier 322.

In some embodiments, the tokenizer 316 may be a computer module that performs lexical analysis. The tokenizer 316 may convert a sequence of characters into a sequence of tokens. A token may be a string of characters included in an electronic document and categorized as a meaningful symbol. Further, in some embodiments, the tokenizer 316 may identify word boundaries in an electronic document and break any text passages within the document into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be a computer module that marks up a word in passages to correspond to a particular part of speech. The POS tagger 318 may read a passage or other text in natural language and assign a part of speech to each word or other token. The POS tagger 318 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one social media post may shed light on the meaning of text elements in another social media post, particularly if they involve the same topic). Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a passage with part of speech categories. In some embodiments, the POS tagger 318 may tag tokens or words of a passage to be parsed by the natural language processing system 312.

In some embodiments, the semantic relationship identifier 320 may be a computer module that may be configured to identify semantic relationships of recognized text elements (e.g., words, phrases) in documents. In some embodiments, the semantic relationship identifier 320 may determine functional dependencies between entities and other semantic relationships.

Consistent with various embodiments, the syntactic relationship identifier 322 may be a computer module that may be configured to identify syntactic relationships in a passage composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

In some embodiments, the natural language processor 314 may be a computer module that may parse a document and generate corresponding data structures for one or more portions of the document. For example, in response to receiving a query at the natural language processing system 312, the natural language processor 314 may output parsed text elements from the query as data structures. In some embodiments, a parsed text element may be represented in the form of a parse tree or other graph structure. To generate the parsed text element, the natural language processor 314 may trigger computer modules 316-322.

In some embodiments, the output of the natural language processor 314 may be stored as an information corpus 326 in one or more data sources 324. In some embodiments, data sources 324 may include data warehouses, information corpora, data models, and document repositories. The information corpus 326 may enable data storage and retrieval. In some embodiments, the information corpus 326 may be a storage mechanism that houses a standardized, consistent, clean, and integrated copy of the ingested and parsed queries and/or social media posts. The information corpus 326 may also include a list of concepts found in the analyzed documents. The data may be sourced from various operational systems. Data stored in the information corpus 326 may be structured in a way to specifically address analytic requirements. For example, the information corpus 326 may store the analyzed documents in groups based on whether they come from the user (e.g., a social media post), a trusted source (e.g., a news source that the user trusts), or an untrusted source (e.g., a news source that the user does not trust). This may make generating the user profile and/or a response to a user query easier. In some embodiments, the information corpus 326 may be a relational database.

In some embodiments, the natural language processing system 312 may include a profile generator 330. The profile generator 330 may be a computer module that is configured to generate a profile for a user. The profile may include characteristics about the user (e.g., age, preferred channels based on response type, mood). In some embodiments, the profile generator 330 may be configured to analyze a variety of documents for a user (e.g., social media posts, data entered directly by the user, chat transcripts from previous interactions with chatbots) and generate the user profile based on the analyzed documents. The user profile may be stored in the information corpus 326 for use in generating responses to queries.

The natural language processing system 312 may further include a query analyzer 332. The query analyzer 332 may be configured to receive and analyze a user query using the natural language processor 314 and the information corpus 326. For example, the query analyzer 332 may retrieve a query from a user, determine that the query requests information about a specific topic, analyze the information corpus 326 to determine a set of trusted sources for the topic, and generate a response to the query based on data retrieved from the trusted sources.

Figure 4:
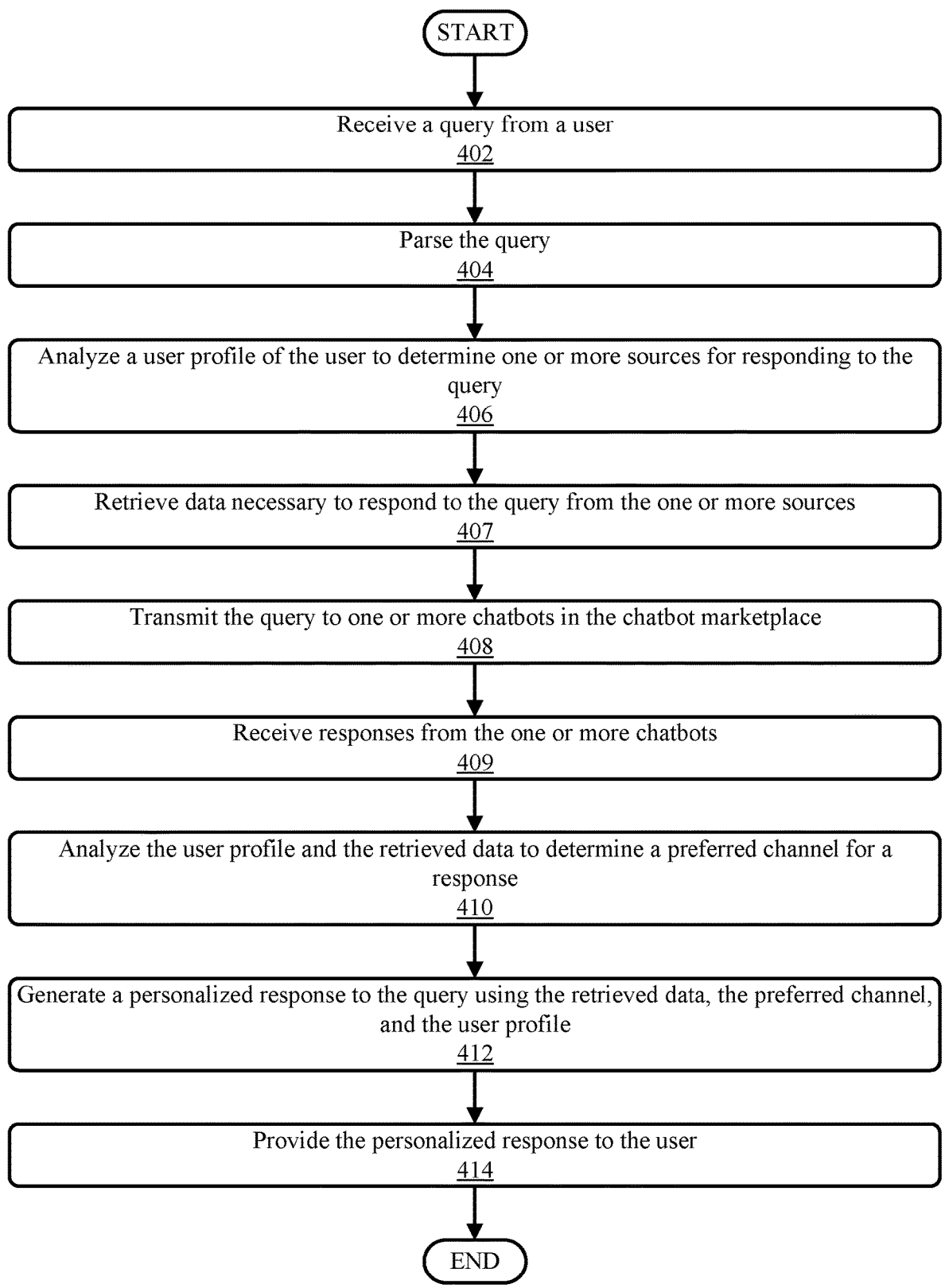
FIG. 4 illustrates a flowchart of an example method for generating a personalized response to a question based on a user profile, in accordance with embodiments of the present disclosure.

Referring now to FIG. 4, illustrated is a flowchart of an example method 400 for generating a personalized response to a question based on a user profile, in accordance with embodiments of the present disclosure. The method 400 may be performed by hardware, firmware, software executing on a processor, or any combination thereof. For example, the method 400 may be performed by an omnichannel assistant. The method 400 may begin at operation 402, wherein the omnichannel assistant receives a query from a user.

The query may be received in numerous forms. For example, the query may be a text query entered into a computer system using a user interface. Alternatively, or additionally, the query may be in the form of a video, an audio message, or any other form. The query may request, for example, that the omnichannel assistant perform an action (e.g., turn on music, pay a bill, etc.), retrieve data (e.g., open a website), or answer a question.

After receiving the query at operation 402, the omnichannel assistant may parse the query at operation 404. Parsing the query may include performing natural language processing on the query to understand what the query is requesting. Parsing the query may include identifying an intent of the query, an entity that sent the query, and/or tone and sentiment of the query. In some embodiments, the omnichannel assistant may analyze a user profile for the user when parsing the query. This may allow the omnichannel assistant to more accurately parse the query based on how the user interacts with the omnichannel assistant.

In some embodiments, parsing the query may include performing optical character recognition (e.g., on a scanned document) to convert the document into machine-encoded text. In other embodiments, parsing the query may include performing speech to text on received audio (e.g., from an audio or video file). In still other embodiments, parsing the query may include performing image recognition on the query (e.g., if the query is in the form of, or includes, one or more images or videos) to identify objects in the query. Some embodiments may include performing all of the above and other operations to parse the query.

At operation 406, the omnichannel assistant analyzes a user profile of the user to determine one or more sources for responding to the query. The one or more sources may include trusted sources (i.e., sources the user trusts) based on the user profile. The trusted sources may include websites, individuals, other chatbots, or any other source of information that may be used to respond to the query. The trusted sources may be selected by the user (e.g., during an initialization of the omnichannel assistant). In some embodiments, the trusted sources may be selected based on the content/context of the query. For example, a query asking about the score of a sporting event may have a different set of trusted sources than a query asking about a current event or political issue.

In some embodiments, the trusted sources may also include sources that the omnichannel assistant believes the user will trust based on the user profile. For example, the omnichannel assistant may compare the user's profile with profiles for other users, and determine that the user has a similar profile to a second user. The omnichannel assistant may then determine that one or more sources that the second user trusted may also be trusted by the user. The omnichannel assistant may present these additional sources to the user for verification, or it may automatically decide that the additional sources are trustworthy.

At operation 407, the omnichannel assistant may retrieve data necessary to respond to the query from the one or more sources. For example, the omnichannel assistant may extract information to respond to the query (e.g., answer a question) from a trusted website. In some embodiments, if the omnichannel assistant is not confident that the trusted website's information is accurate or answers the user's question, the omnichannel assistant may ask the user if alternative sources may be consulted. For example, the omnichannel assistant may send the query to one or more other chatbots in a chatbot marketplace if it is unable to confidently respond to the query using other trusted sources. This is shown at operation 408. The omnichannel assistant may then receive responses from the one or more chatbots at operation 409. If a response from one of the one or more chatbots has a high confidence score, the omnichannel assistant may use that response when responding to the query.

At operation 410, the omnichannel assistant may analyze the user profile and the retrieved data to determine a preferred channel for the response. For example, the user profile may store a preference that responses be provided in video form whenever possible. The omnichannel assistant may then determine whether the data can be provided visually (e.g., by linking to a video on a video hosting website). As another example, the omnichannel assistant may determine that the user is blind, and it may determine that an audio response is most appropriate.

At operation 412, the omnichannel assistant may generate a personalized response to the query. The personalized response may be generated using the retrieved data (e.g., from the trusted sources, including trusted individuals or chatbots), the preferred channel (e.g., video response vs. textual response), and the user profile (e.g., the age of the user).

At operation 414, the personalized response may be provided to the user, and the method 400 may end.

An example of the omnichannel assistant interacting with multiple users is now described for illustrative purposes. It is the be understood in advance that this example is not meant to be limiting, and that the omnichannel assistant may perform all, some, or none of these steps in some embodiments.

Initially, a user (Sally) would like to get some information about a specific topic, and she asks her trusted omnichannel assistant. The omnichannel assistant uses Sally's trusted sources to determine an answer. The chatbot sees that the confidence score returned is not very high and asks Sally if additional sources could be searched from other sources which are also trustworthy, to which Sally agrees. Sally then asks another question on this topic, but the responses returned have a low confidence score, meaning that the omnichannel assistance is not confident that the responses are good. The omnichannel assistant therefore goes to a chatbot marketplace of trusted chatbots to see if any of them have an answer. The omnichannel assistant receives a better response from one of the trusted chatbots. The omnichannel assistant realizes that the response received in its current form is too complex for Sally to understand. Accordingly, the omnichannel assistant formulates an easier response by embedding appropriate video and other content in the response.

Sally's son then comes and starts asking some questions to the omnichannel assistant. The omnichannel assistant realizes that it is conversing with a child, so it adjust responses accordingly such that the responses are simpler and has more multimedia content. The omnichannel assistant may also use language that is more acceptable for the child. The interface also changes so that the child can interact with the omnichannel assistant using a freeform written interface, as opposed to a more structured interface.

During this interaction, Sally's manager's chatbot contacts Sally's omnichannel assistant asking Sally if she is free to join an important meeting tomorrow afternoon. Sally's omnichannel assistant checks Sally's calendar, confirms the time is available, and blocks it off. When the omnichannel assistant detects that its Sally typing again, the omnichannel assistant lets Sally know about the dialog it had and reminds Sally to cancel the meeting in her calendar if the meeting should not have been scheduled.

Figure 5:
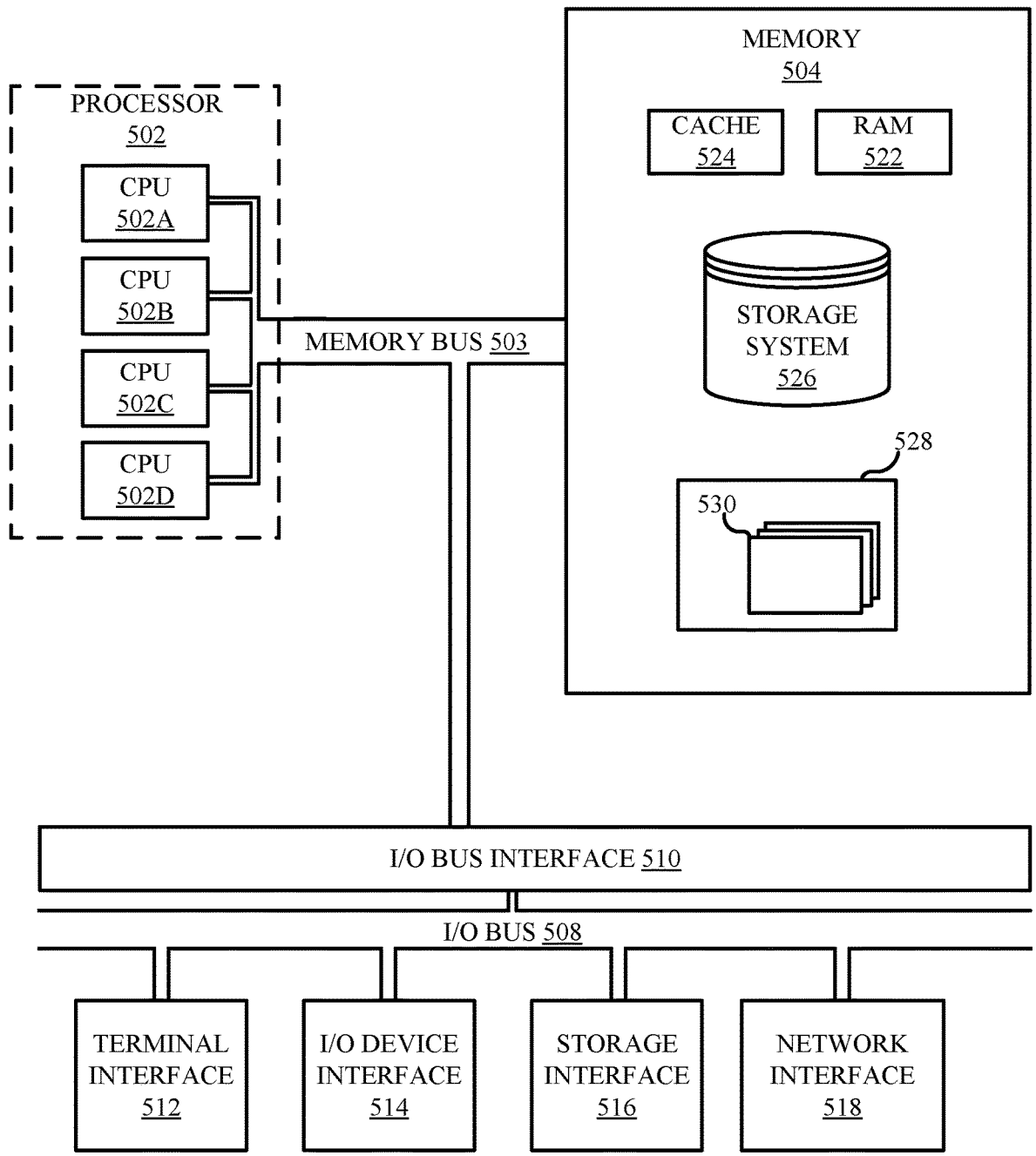
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
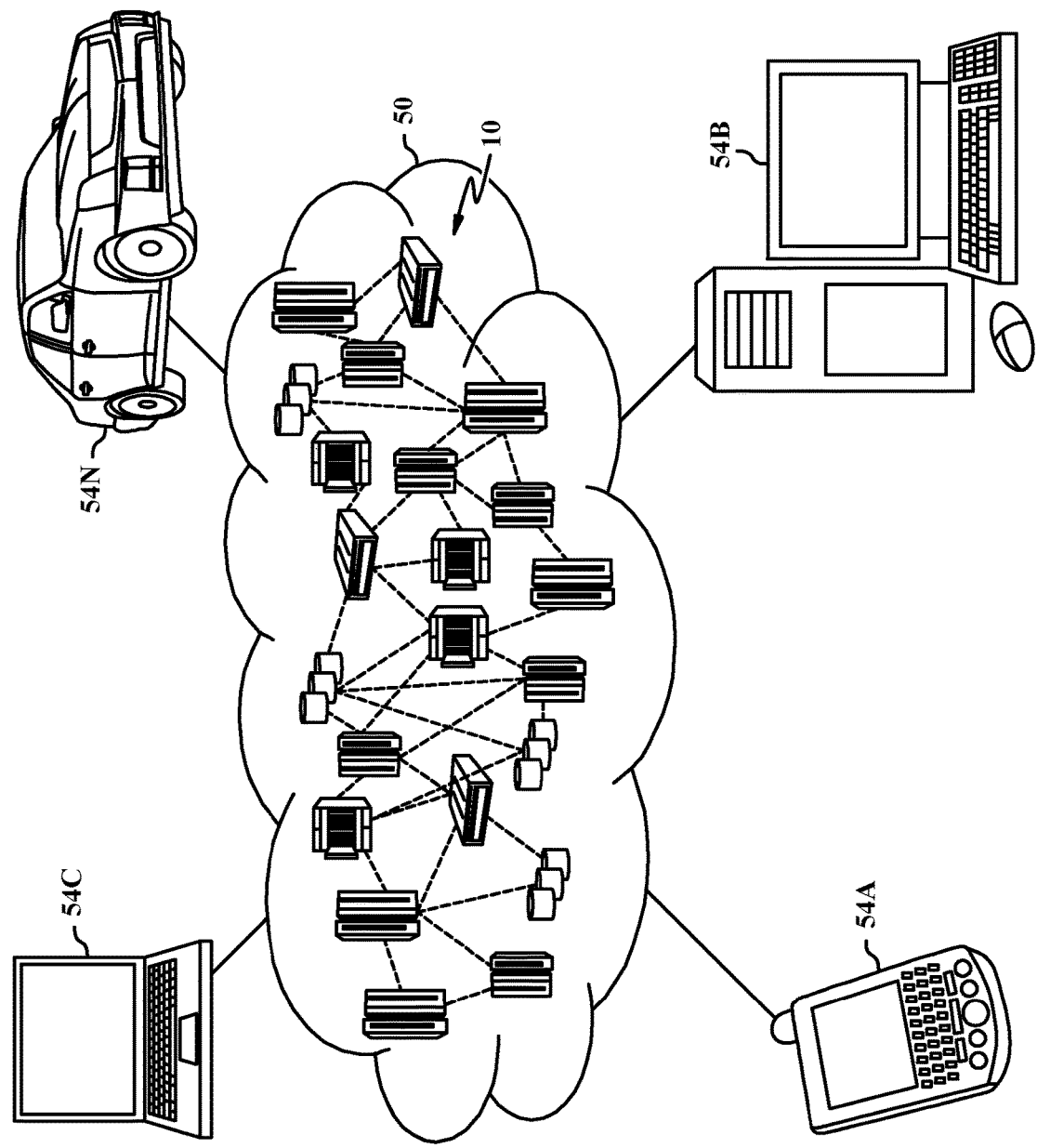
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
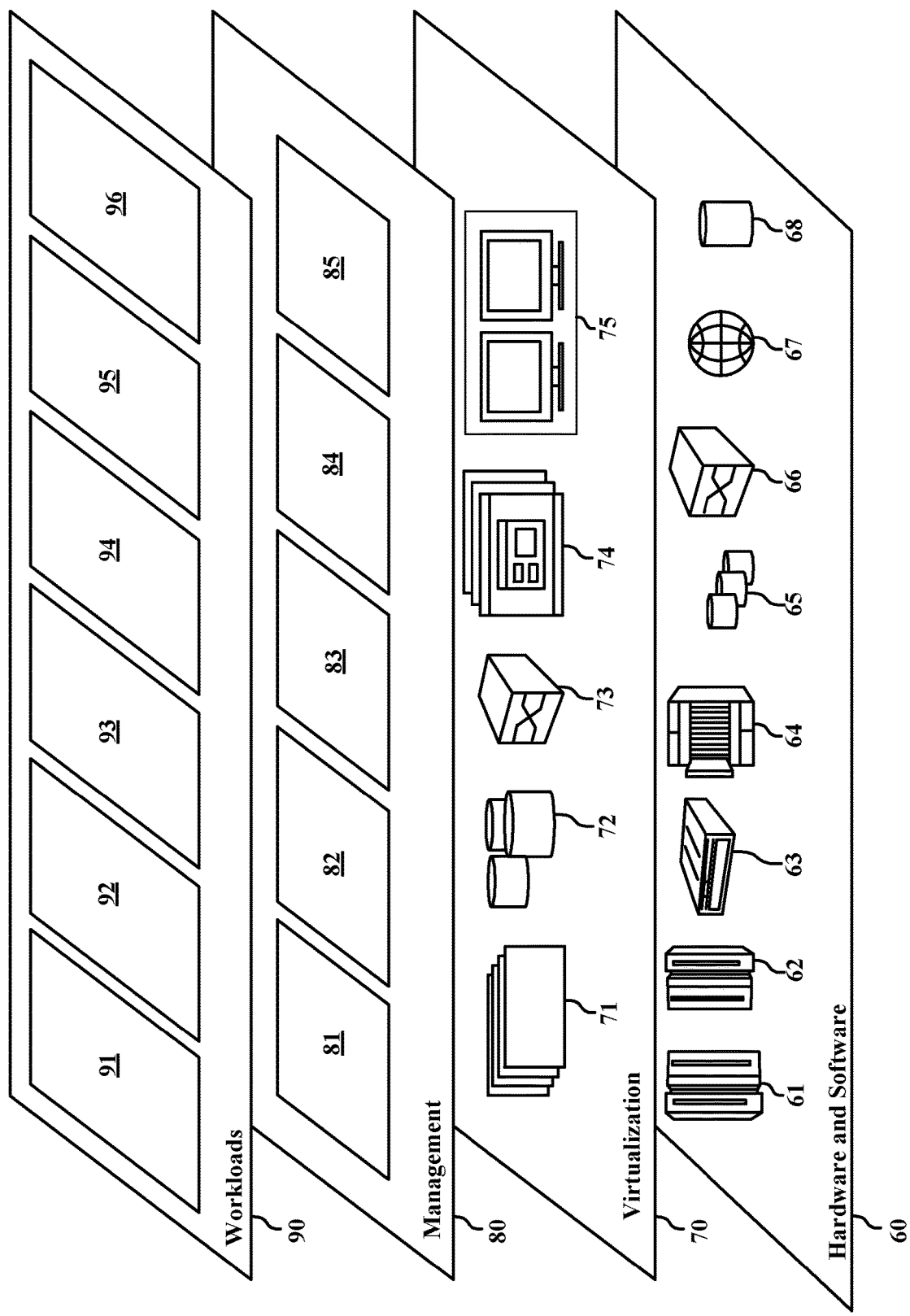
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method for providing a personalized response to a user query, the method comprising:
   receiving, by an omnichannel assistant, a query from a user, wherein the omnichannel assistant is configured to interact with the user across two or more channels;
   parsing the query to identify a user intent of the query and one or more sources for responding to the query based at least in part on the user intent of the query, the one or more sources including one or more trusted chatbots in a chatbot marketplace that enables chatbot-to-chatbot communication and aggregation of chatbot responses, wherein the chatbot marketplace includes trusted and untrusted chatbots, and the omnichannel assistant is trained using a trusted corpus to identify the one or more trusted chatbots in the chatbot marketplace that provide trustworthy chatbot responses and communicate only with the one or more trusted chatbots;
   retrieving answer data for responding to the query from the one or more sources including the one or more trusted chatbots in the chatbot marketplace, the answer data including one or more answers to the query that correspond to the user intent of the query;
   analyzing the retrieved answer data to determine one or more potential channels for transmitting the retrieved answer data to the user;
   selecting, from the two or more channels, a channel for a response based at least in part on a user profile and the one or more potential channels for transmitting the retrieved answer data to the user;
   generating the response to the query using the retrieved answer data, the selected channel, and the user profile; and
   transmitting the response to the user over the selected channel.

2. The method of claim 1, wherein parsing the query further comprises:
   determining an entity associated with the query; and
   determining a tone of the query,
   wherein the query is parsed using natural language processing and the user profile.

3. The method of claim 1, the method further comprising generating the user profile for the user based on one or more electronic documents associated with the user.

4. The method of claim 3, wherein the one or more electronic documents include at least one chat transcript and at least one social media post for the user, and wherein generating the user profile comprises:
   analyzing, using natural language processing, the one or more electronic documents;
   determining, based on the analyzing, a set of sources that the user trusts, including the one or more trusted chatbots;
   determining, based on the analyzing, characteristics of the user, wherein the characteristics include an age of the user and a channel preference of the user;
   determining, based on the analyzing, a mood of the user; and
   storing the set of sources that the user trusts, the characteristics of the user, and the mood of the user in the user profile.

5. The method of claim 1, wherein retrieving the data to respond to the query from the one or more sources comprises:
analyzing data from trusted sources to determine whether the data can be used to formulate the response;
determining that a response generated from the trusted sources has a confidence level below a predetermined threshold; and
transmitting the query to the one or more trusted chatbots in the chatbot marketplace.

6. The method of claim 5, the method further comprising:
receiving, from a trusted chatbot in the chatbot marketplace, a first response;
determining that the first response has a confidence level that exceeds the predetermined threshold; and
generating the response to the query using the first response received from the trusted chatbot.

7. An omnichannel assistant comprising:
a memory; and
a processor communicatively coupled to the memory, wherein the processor is configured to:
receive a query from a user, wherein the processor is configured to interact with the user across two or more channels;
parse the query to identify a user intent of the query and one or more sources for responding to the query based at least in part on the user intent of the query, the one or more sources including one or more trusted chatbots in a chatbot marketplace that enables chatbot-to-chatbot communication and aggregation of chatbot responses, wherein the chatbot marketplace includes trusted and untrusted chatbots, and the omnichannel assistant is trained using a trusted corpus to identify the one or more trusted chatbots in the chatbot marketplace that provide trustworthy chatbot responses and communicate only with the one or more trusted chatbots;
retrieve answer data for responding to the query from the one or more sources including the one or more chatbots in the chatbot marketplace, the answer data including one or more answers to the query that correspond to the user intent of the query;
analyze the retrieved answer data to determine one or more potential channels for transmitting the one or more answers to the user;
select, from the two or more channels, a channel for a response based at least in part on a user profile and the one or more potential channels for transmitting the one or more answers to the user;
generate the response to the query using the one or more answers, the selected channel, and the user profile; and
transmit the response to the user over the selected channel.

8. The omnichannel assistant of claim 7, wherein parsing the query further comprises:
determining an entity associated with the query; and
determining a tone of the query,
wherein the query is parsed using natural language processing and the user profile.

9. The omnichannel assistant of claim 7, wherein the processor is further configured to generate the user profile for the user based on one or more electronic documents associated with the user.

10. The omnichannel assistant of claim 9, wherein the one or more electronic documents include at least one chat transcript and at least one social media post for the user, and wherein generating the user profile comprises:
analyzing, using natural language processing, the one or more electronic documents;
determining, based on the analyzing, a set of sources that the user trusts, including the one or more trusted chatbots;
determining, based on the analyzing, characteristics of the user, wherein the characteristics include an age of the user and a channel preference of the user;
determining, based on the analyzing, a mood of the user; and
storing the set of sources that the user trusts, the characteristics of the user, and the mood of the user in the user profile.

11. The omnichannel assistant of claim 7, wherein retrieving the data to respond to the query from the one or more sources comprises:
analyzing data from trusted sources to determine whether the data can be used to formulate the response;
determining that a response generated from the trusted sources has a confidence level below a predetermined threshold; and
transmitting the query to the one or more trusted chatbots in the chatbot marketplace.

12. The omnichannel assistant of claim 11, wherein the processor is further configured to:
receive, from a trusted chatbot in the chatbot marketplace, a first response;
determine that the first response has a confidence level that exceeds the predetermined threshold; and
generate the response to the query using the first response received from the trusted chatbot.

13. A computer program product comprising a computer readable storage medium having program instructions embodied therewith, the program instructions executable by processor of an omnichannel assistant to cause the processor to:
receive a query from a user, wherein the omnichannel assistant is configured to interact with the user across two or more channels;
parse the query to identify a user intent of the query and one or more sources for responding to the query based at least in part on the user intent of the query, the one or more sources including one or more trusted chatbots in a chatbot marketplace that enables chatbot-to-chatbot communication and aggregation of chatbot responses, wherein the chatbot marketplace includes trusted and untrusted chatbots, and the omnichannel assistant is trained using a trusted corpus to identify the one or more trusted chatbots in the chatbot marketplace that provide trustworthy chatbot responses and communicate only with the one or more trusted chatbots;
retrieve answer data for responding to the query from the one or more sources including the one or more chatbots in the chatbot marketplace, the answer data including one or more answers to the query that correspond to the user intent of the query;
analyze the retrieved answer data to determine one or more potential channels for transmitting the retrieved answer data to the user;
select, from the two or more channels, a channel for a response based at least in part on a user profile and the one or more potential channels for transmitting the retrieved answer data to the user;
generate the response to the query using the retrieved answer data, the selected channel, and the user profile; and
transmit the response to the user over the selected channel.

14. The computer program product of claim 13, wherein parsing the query further comprises:
   determining an entity associated with the query; and
   determining a sentiment of the query,
      wherein the query is parsed using natural language processing and the user profile.

15. The computer program product of claim 13, wherein the program instructions further cause the processor to generate the user profile for the user based on one or more electronic documents associated with the user.

16. The computer program product of claim 15, wherein the one or more electronic documents include at least one chat transcript and at least one social media post for the user, and wherein generating the user profile comprises:
   analyzing, using natural language processing, the one or more electronic documents;
   determining, based on the analyzing, a set of sources that the user trusts, including the one or more trusted chatbots;
   determining, based on the analyzing, characteristics of the user, wherein the characteristics include an age of the user and a channel preference of the user;
   determining, based on the analyzing, a mood of the user; and
   storing the set of sources that the user trusts, the characteristics of the user, and the mood of the user in the user profile.

17. The computer program product of claim 13, wherein retrieving the data to respond to the query from the one or more sources comprises:
   analyzing data from trusted sources to determine whether the data can be used to formulate the response;
   determining that a response generated from the trusted sources has a confidence level below a predetermined threshold; and
   transmitting, in response to determining that the response generated from the trusted sources has a confidence level below a predetermined threshold, the query to the one or more trusted chatbots in the chatbot marketplace.

18. The computer program product of claim 17, wherein the program instructions further cause the processor to:
   receive, from a trusted chatbot in the chatbot marketplace, a first response;
   determine that the first response has a confidence level that exceeds the predetermined threshold; and
   generate the response to the query using the first response received from the trusted chatbot.

\* \* \* \* \*